UNITED STATES PATENT OFFICE.

WILLIAM P. CLOTWORTHY, OF BALTIMORE, MARYLAND, ASSIGNOR TO SMITH, HANWAY & CO.

IMPROVEMENT IN FLAVORING-POWDERS.

Specification forming part of Letters Patent No. 186,712, dated January 30, 1877; application filed December 26, 1876.

*To all whom it may concern:*

Be it known that I, WILLIAM P. CLOTWORTHY, of the city of Baltimore, in the State of Maryland, have invented a new and useful Compound called "Flavoring-Powders," which compound is fully described in the following specification:

This invention relates to that class of compounds used for flavoring articles of food and luxuries of the table, such as ice-cream, blanc-mange, jellies, custards, cakes, and deserts, so as to give them a delicacy and fragrance they would not otherwise possess, and render them more acceptable to the taste; and it consists of a composition of matter formed by mixing one or more of the extracts or essential oils of the flowers, roots, beans, plants, seeds, barks, resins, &c., whence the desired flavors are expressed or distilled, with an absorbent, such as dry starch, flour, arrow-root, dextrine, powdered sugar, meal, or other dry powder capable of absorbing and preserving said flavors for use.

To prepare the flavoring-powder for use, take a liquid extract of the desired flavor, of sufficient strength and purity to permeate a dry powder, preferably corn-starch, of six times its weight; then take of corn-starch or flour six times the weight of the fluid-extract, and mix the same together by careful and thorough trituration, until every particle of the absorbent is permeated with the flavor of the extract; then pass the same through a fine sieve.

After such admixture, said powder is ready to be used in flavoring ices, cake, deserts, &c., and possesses several advantages over the liquid extracts now in general use for culinary flavoring.

It can be more readily mixed with, and its flavor disseminated through, the substance operated upon than liquid can; it is easier of measurement by the crude utensils of the kitchen, and therefore less liable to be used in excess, or to be wasted by spilling or evaporation, and it possesses, in fact, all of the recognized advantages for culinary purposes in the packing, keeping, handling, measuring, and using of a dry over a liquid substance.

I am well aware that liquid extracts have long been used for flavoring purposes; and I do not claim any invention in them.

What I claim as my invention is—

As a new article of food, flavoring-powders, compounded of fluid extracts or essential oils, used for flavoring food and table luxuries, and starch, meal, flour, or other dry absorbent, substantially as and for the purpose specified.

WILLIAM P. CLOTWORTHY.

Witnesses:
LEWIS B. BROWNE,
WM. V. LOGAN.